United States Patent
Yi et al.

(10) Patent No.: US 10,770,904 B2
(45) Date of Patent: Sep. 8, 2020

(54) MPC-BASED PV MAXIMUM POWER POINT TRACKER FOR TRANSFORMERLESS H5 INVERTER WITH LEAKAGE CURRENT REDUCTION

(71) Applicants: Zhehan Yi, San Jose, CA (US); Haifeng Li, Nanjing (CN); Xiaohu Zhang, San Jose, CA (US); Xiaoying Zhao, San Jose, CA (US); Di Shi, San Jose, CA (US); Ruisheng Diao, San Jose, CA (US); Zhiwei Wang, San Jose, CA (US)

(72) Inventors: Zhehan Yi, San Jose, CA (US); Haifeng Li, Nanjing (CN); Xiaohu Zhang, San Jose, CA (US); Xiaoying Zhao, San Jose, CA (US); Di Shi, San Jose, CA (US); Ruisheng Diao, San Jose, CA (US); Zhiwei Wang, San Jose, CA (US)

(73) Assignees: State Grid Corporation of China Co. Ltd (CN); Global Energy Interconnection Research Institute Co. Ltd (CN); State Grid Beijing Electric Power Company (CN)

(*) Notice: Subject to any disclaimer, the term of this patent is extended or adjusted under 35 U.S.C. 154(b) by 32 days.

(21) Appl. No.: 16/390,510

(22) Filed: Apr. 22, 2019

(65) Prior Publication Data

US 2019/0363541 A1    Nov. 28, 2019

Related U.S. Application Data

(60) Provisional application No. 62/675,895, filed on May 24, 2018.

(51) Int. Cl.
    *H02J 3/38*     (2006.01)
    *H02M 7/5387*   (2007.01)

(52) U.S. Cl.
    CPC ......... *H02J 3/385* (2013.01); *H02M 7/53871* (2013.01)

(58) Field of Classification Search
    CPC .......................... H02J 3/385; H02M 7/53871
    See application file for complete search history.

(56) References Cited

U.S. PATENT DOCUMENTS

2020/0212825 A1* 7/2020 Li ........................... H02J 3/381

* cited by examiner

*Primary Examiner* — Robert L Deberadinis
(74) *Attorney, Agent, or Firm* — Patent Law Office, PC; Bao Tran

(57) ABSTRACT

Systems and methods are disclosed to control a power inverter by extracting photovoltaic (PV) maximum power under a plurality of operating conditions as one or more reference variables; predicting the future behaviors of a PV output voltage as one or more controlled variables based on a current operational condition; generating one or more control signals for the H5 inverter that minimizes an error between the reference variable and the controlled variables; and controlling the power inverter with the one or more control signals.

20 Claims, 8 Drawing Sheets

MPC-BASED PV MAXIMUM POWER POINT TRACKER FOR TRANSFORMERLESS H5 INVERTER WITH LEAKAGE CURRENT REDUCTION

BACKGROUND

The present invention relates to power inverter controller for transformerless solar PV systems.

Renewable distributed energy resources (DERs), such as solar photovoltaic (PV) and wind power systems, have been getting more attention recently to be used as alternatives to fossil fuels. PV power systems are considered as one of the most attractive renewable DER technologies thanks to the abundance of solar energy and the declining capital and operational expenses. Generally, PV systems can be interfaced with the utility grid through transformer-isolation or transformerless configurations. Since line frequency transformers are heavy, inefficient, and cost-ineffective for PV systems, transformerless configurations are attracting more and more interests from both research and commercial points of view. However, the lack of galvanic isolation in the transformerless configurations will lead to a common-mode (CM) leakage current between the PV panels and the ground through parasitic capacitors, which reduces the overall efficiency and grid current quality and may cause serious electromagnetic interference and insecurity issues. The parasitic capacitance is approximately 60 nF to 110 nF every kilowatt of the PV array. Therefore, various inverter topologies with specific modulation strategies have been introduced to suppress the leakage current, in which only a few topologies have been developed into industrial products, e.g., H5, H6, and HERIC inverters. The H5 structure is adopted by the SMA Solar Technology due to its simple topology with the least number of switches.

FIG. 1 illustrates a typical grid-connected transformerless PV system using an H5 inverter, where $i_{Leak}$ stands for the CM leakage current, CP is the PV parasitic capacitor mentioned previously. In order to extract the maximum power of a PV array under different ambient conditions (irradiance and temperature), maximum power point tracking (MPPT) algorithms, such as Perturb & Observe (P&O) and Incremental Conductance (In-Cond), are employed to control the power-electronics stage. Although there are numerous existing methods to implement MPPT for grid-tied PV systems, most of them use two-stage cascaded DC/DC-DC/AC converting systems or single-stage DC/AC inverters with PI-based controllers or their variants. These methods may suffer from one or multiple of the following major drawbacks:

- PI-based controllers require iterative tuning efforts when system parameters change;
- It is relatively difficult to find optimal gain and time constants for the controllers;
- Extra pulse width modulation (PWM) modules are required;
- Some of the methods require multiple stages of costly converters, which reduces the converting efficiency; and
- CM leakage current is not considered in most methods.

The topology of an H5 inverter is similar to the single-phase full-bridge inverter by adding an extra DC-bypass switch "S5" that disconnects the PV array from the utility grid during the current-freewheeling periods. FIG. 1 shows the topology of H5 inverter with the leakage current ($i_{Leak}$) between the PV array and the ground. In general, there are four operation modes for H5 inverters, which are depicted FIG. 2. The first operation mode (FIG. 2(a)) is the active mode which occurs during the positive-half cycle, where the switches S1, S4, and S5 are conducting and the current flows through S1 and S5 and then returns to the cathode of the PV array through S4. The second mode of operation shown in FIG. 2(b) is also referred to as the current freewheeling mode with the zero-voltage vector. In this mode, S1 is triggered on, while S4 and S5 are turned-off. The current is conducting through the freewheeling diode of S3. FIG. 2(c) illustrates the third mode of operation of H5 inverter, which is the active mode that occurs during the negative-half cycle. During mode 3, switches S2, S3, and S5 conduct and the current flows through the inductors L1 and L2 in the opposite direction of that in mode 1. The fourth mode is the freewheeling mode during the zero-voltage vector where S2 and S5 are turned-off and S3 is on. Similar to S3 in mode 2 (FIG. 2(b)), S1 works as a freewheeling diode in mode 4. Table I and FIG. 3 show the operation modes and space vector modulation (SVM) of the H5 inverter.

TABLE I

| H5 INVERTER SWITCHING STATES | | | | | | |
| --- | --- | --- | --- | --- | --- | --- |
| Mode | S1 | S2 | S3 | S4 | S5 | $V_{out}$ |
| 1 | 1 | 0 | 0 | 1 | 1 | $V_{PV}$ |
| 2 | 1 | 0 | 0 | 0 | 0 | 0 |
| 3 | 0 | 1 | 1 | 0 | 1 | $-V_{PV}$ |
| 4 | 0 | 0 | 1 | 0 | 0 | 0 |

SUMMARY

In one aspect, a model-predictive-control (MPC)-based system controls a transformerless H5 inverter for single-phase PV distributed generation system. The system provides fault-ride-through capability and further reduces the PV leakage current in a cost-effective and safe manner. Moreover, for the first of its kind, PV maximum power point tracking is implemented in the single-stage H5 inverter using MPC-based controllers.

In another aspect, systems and methods are disclosed to control a power inverter by extracting photovoltaic (PV) maximum power under a plurality of operational conditions as one or more reference variables; predicting a future behavior of a PV output voltage as one or more controlled variables based on a current operational condition; generating one or more control signals for the H5 inverter that minimizes an error between the reference variable and the controlled variables; and controlling the power inverter with the one or more control signals.

Advantages of the system may include one or more of the following. The (MPC)-based controller enables single-stage transformerless H5 inverters to be used for PV distributed generation systems. The system provides fault-ride-through capability and further reduces the PV leakage current in a cost-effective and safe manner. Moreover, for the first of its kind, PV maximum power point tracking is implemented in the single-stage H5 inverter using MPC-based controllers. The system provides a fast and accurate maximum power point tracker, and reduces the PV leakage current, and improves the fault-ride-through capability of transformerless PV systems. Via optimization, the controller can automatically select the switch signals that lead to a minimum error between the controlling states and references, which eliminates the tuning efforts that required by conventional controllers. Moreover, the switching signals will be directly applied to the H5 inverter without the needs for an extra PWM module, which lowers the cost and complexity of the control system.

BRIEF DESCRIPTIONS OF FIGURES

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Figure 1:
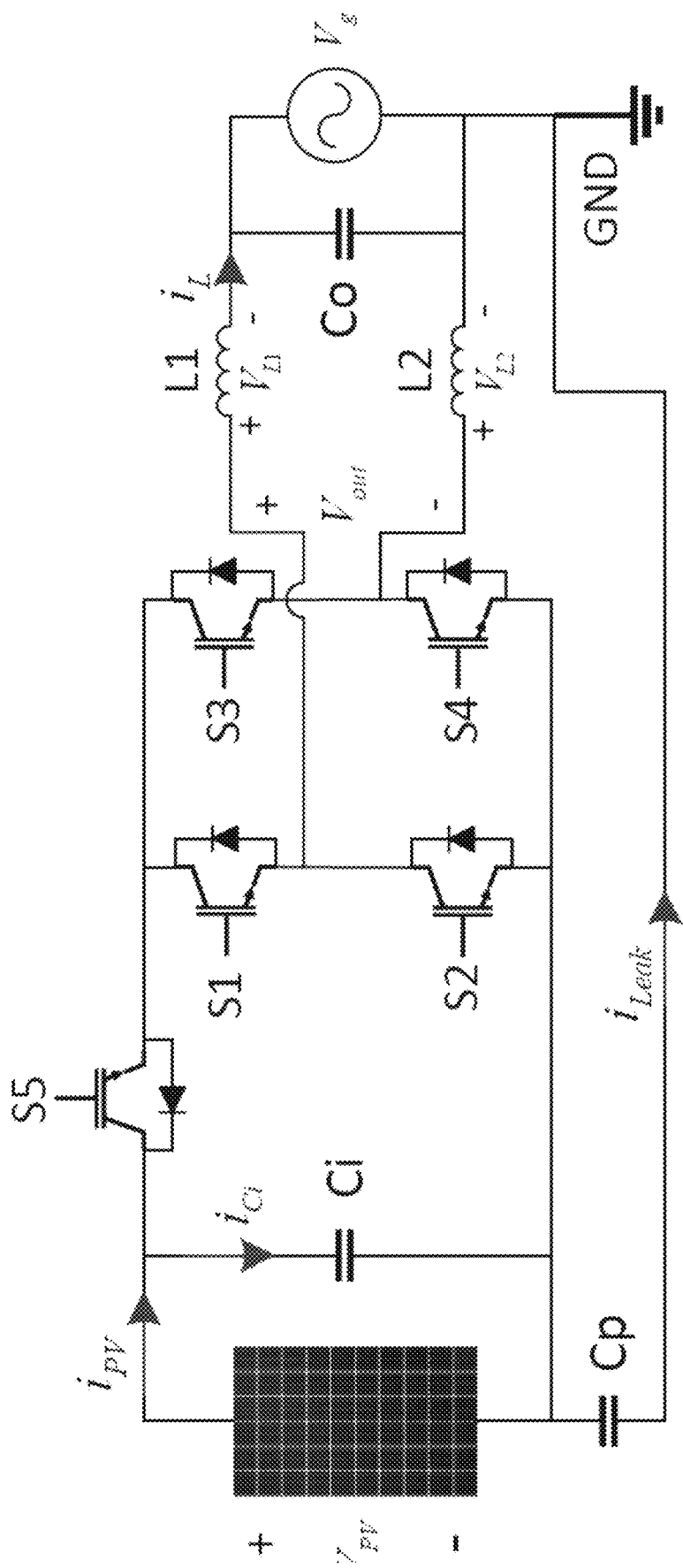
FIG. 1 shows an exemplary diagram of an H5 transformerless inverter in a PV system.
Figures 2, 3:
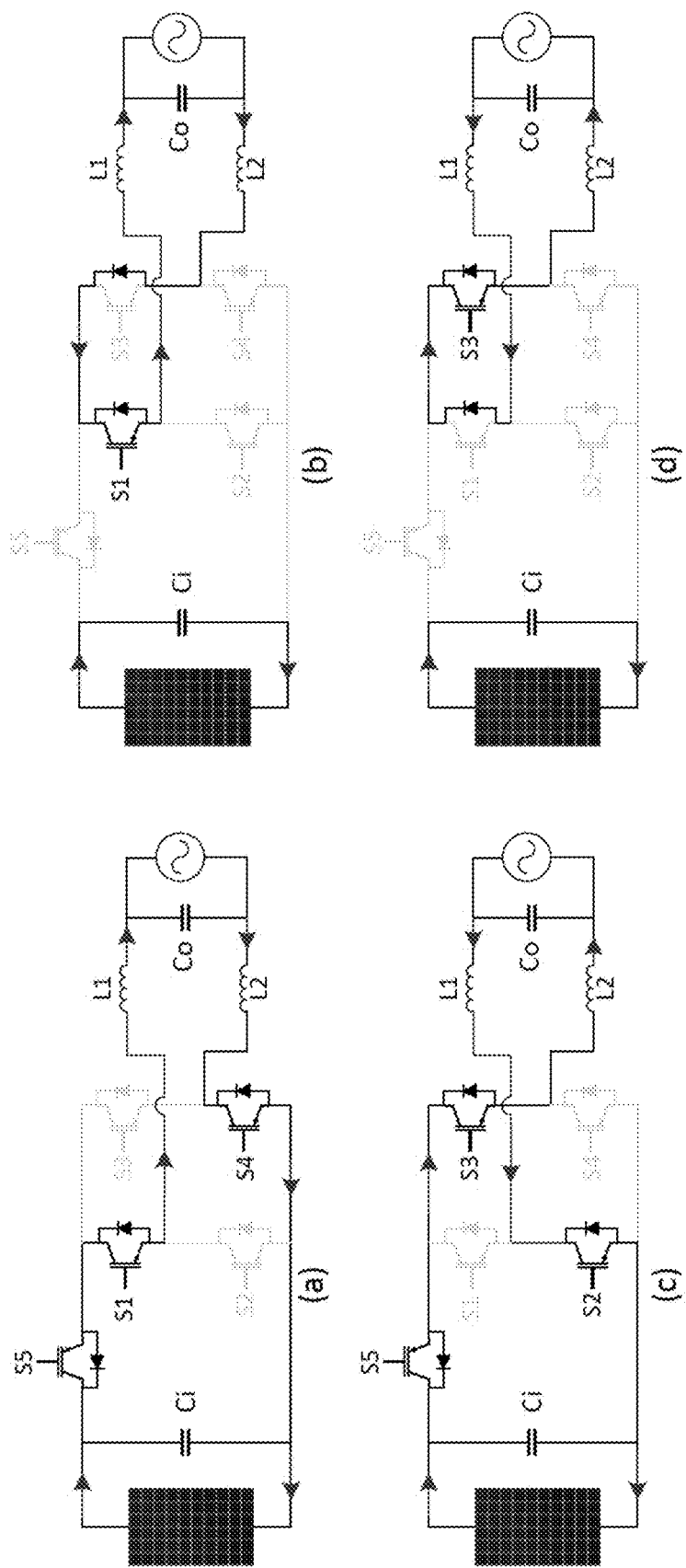
FIG. 2 shows exemplary four operation modes of H5 inverter for grid-connected PV systems.
FIG. 3 shows an exemplary H5 inverter space vector modulation (SVM).

A model-predictive-control (MPC)-based system is detailed below. MPC is an optimal control approach which uses the system model and measurements to predict the future behavior of the controlled states based on minimizing a cost function. MPC is a fast, robust, and accurate controller that requires little tuning efforts. The instant system applies an MPC-based strategy for controlling a single-stage transformerless H5 inverter for PV distributed generation systems. The control strategy further reduces the PV leakage current. Moreover, fast and accurate MPPT is implemented for the single stage H5 transformerless inverter using MPC. Additionally, the instant system improves the robustness and the fault-ride-through capability of transformerless PV systems.

As discussed above, in the first mode of operation, S1, S4, and S5 are conducting. The system model can be derived by KCL and KVL, respectively $$i_{PV}=i_{Ci}+i_L \quad (1)$$

$$V_{PV}=V_{L1}+V_{L2}+V_g \quad (2)$$

where $i_{PV}$ and $V_{PV}$ are the PV array output current and voltage, respectively. $i_{Ci}$ and $i_L$ are the currents through capacitor Ci and the inductor L1, respectively. $V_{L1}$ and $V_{L2}$ are the voltages across inductor L1 and L2 and $V_g$ is the utility grid voltage. In the second mode of operation where only S1 is turned-on, the system model is:

$$i_{PV}=i_{Ci} \quad (3)$$

$$V_{PV}=V_{C1} \quad (4)$$

where $V_{Ci}$ is the capacitor Ci voltage.

In the third mode, S2, S3, and S5 are closed and the system model can be written as:

$$i_{PV}=i_{Ci}+i_L \quad (5)$$

$$V_{PV}=V_{L1}+V_{L2}+V_g \quad (6)$$

During the fourth mode, the only closed switch is S3 and the system model can be given as:

$$i_{PV}=i_{Ci} \quad (7)$$

$$V_{PV}=V_{C1} \quad (8)$$

Additionally, the capacitor current and inductor voltages can be expressed as:

$$i_{Ci} = \frac{dV_{PV}}{dt}, V_{L1} = \frac{di_{L1}}{dt}, V_{L2} = \frac{di_{L2}}{dt} \quad (9)$$

For a PV system, the MPPT is realized by forcing the PV operating pointing to be around a maximum power point, namely, to control $V_{PV}$ to track the MPPT reference voltage $V_{ref}$.

Therefore, we have to predict the future values of PV array voltage, $V_{PV}(k+1)$ per step. To this end, (1), (3), (5), and (7) must be discretized. Using the forward finite differential formula for the derivative:

$$\frac{dx}{dt} \approx \frac{x(k+1) - x(k)}{T_S} \quad (10)$$

where $T_S$ is the sampling period, the future values of the PV output voltage for the aforementioned four operation modes are predicted as:

$$V_{PV1}(k+1) = V_{PV}(k) + \frac{T_S}{C_i}[i_{PV}(k) - i_L(k)] \quad (11)$$

$$V_{PV2}(k+1) = V_{PV}(k) + \frac{T_S}{C_i}i_{PV}(k) \quad (12)$$

$$V_{PV3}(k+1) = V_{PV}(k) + \frac{T_S}{C_i}[i_{PV}(k) - i_L(k)] \quad (13)$$

$$V_{PV4}(k+1) = V_{PV}(k) + \frac{T_S}{C_i}i_{PV}(k) \quad (14)$$

It is noteworthy that for the PV array voltage, the predictions of mode 1 and 3 are identical, so are modes 2 and 4. This will reduce the mode switching frequency and thus the CM leakage current, which will be seen in the verification in the case studies.

Figure 4:
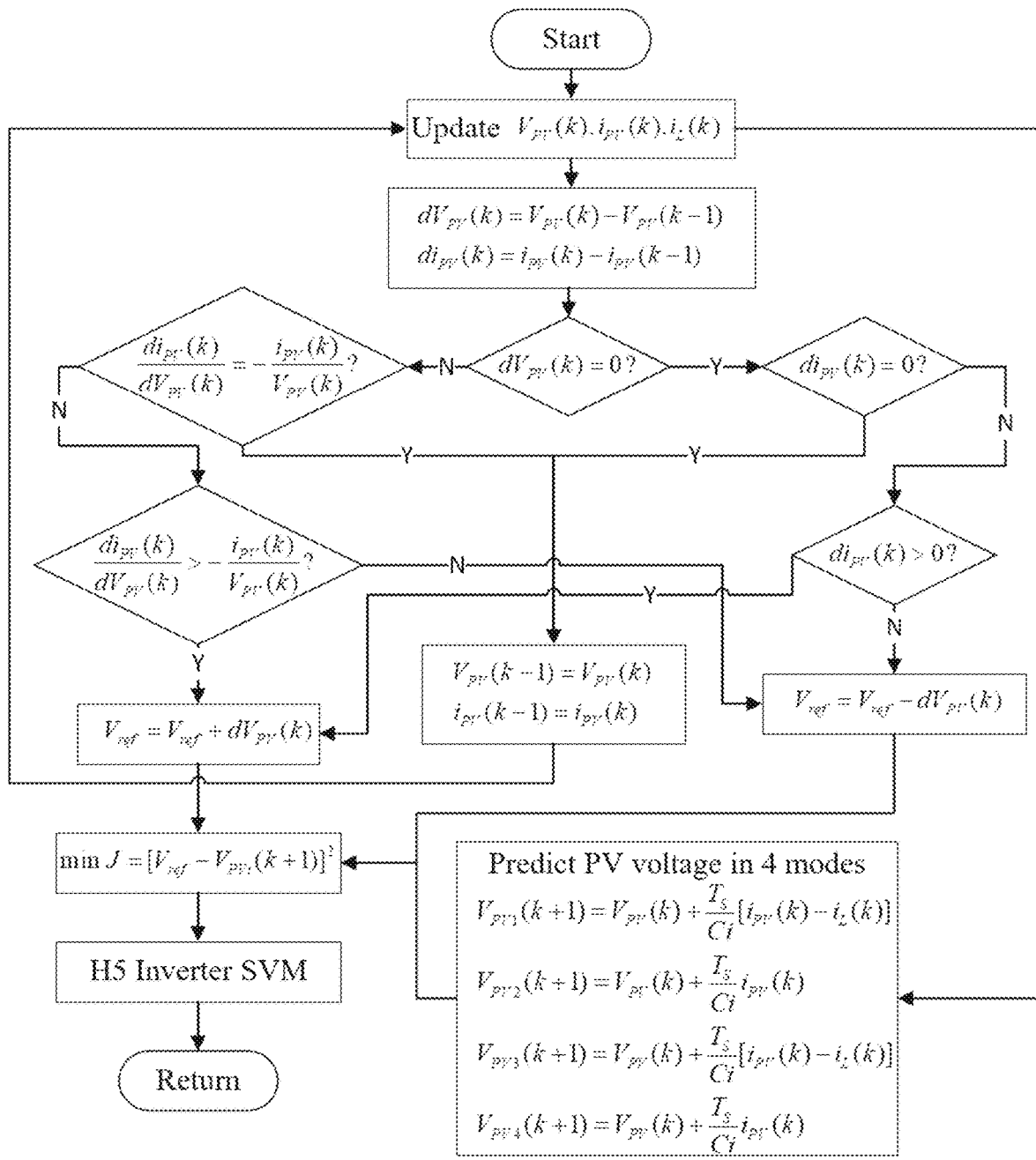
FIG. 4 shows an exemplary MPC-based PV MPPT control for transformerless H5 inverters.

Next, a maximum point power controller of H5 inverter using MPC method is detailed. The system adapts the Incremental Conductance method for extracting the maximum power output of the transformerless PV array with H5 inverter under varying irradiance and temperature. FIG. 4 depicts the process of the instant process in detail. At every sampling period Ts, the controller samples the values of $V_{PV}$, $i_{PV}$, and $i_L$ from the transformerless PV system and follows the procedures of FIG. 4 to determine the optimal control inputs. After predicting the future value of the PV output voltage, a quadratic cost function:

$$J=|V_{ref}-V_{PV}(k+1)|^2 \quad (15)$$

PV array voltage $V_{PV}(k+1)$. The control process is then transferred into an optimization problem, which minimizes the quadratic function (15), i.e., the error between the reference and predicted value, and select the optimal control inputs with the least cost. This is achieved by evaluating each possible scenario (i.e., the four modes of operation) and selecting the best operation mode at every sampling step. Once the optimal operation mode is determined, appropriate gating signals are sent to the H5 inverter switches. Via optimization, the controller will automatically select the switch signals that lead to a minimum error between the controlling states and references, which eliminates the tuning efforts that required by conventional controllers. Moreover, the switching signals will be directly applied to the H5 inverter without the needs for an extra PWM module, which lowers the cost and complexity of the control system.

To examine the performance of the control strategy for H5 inverters, multiple case studies are detailed with result comparisons between the present systems and conventional control methods. The transformerless PV system with the same configuration in FIG. 1 is modeled in the PSCAD/EMTDC platform, while the instant system is implemented using Fortran. The numerical values of the tested system parameters are provided in Table II. The parameters of the PV array are measured under standard testing condition (STC, irradiance=1000 W/m$^2$, temperature=25° C.) It is noteworthy that, although the instant system is verified in a testbed with certain parameters, it is scalable to work for different transformerless PV systems. For systems with other configurations, a similar approach can be used to design the controller. The tested cases are elaborated below.

A. Case Study 1

Figure 5:
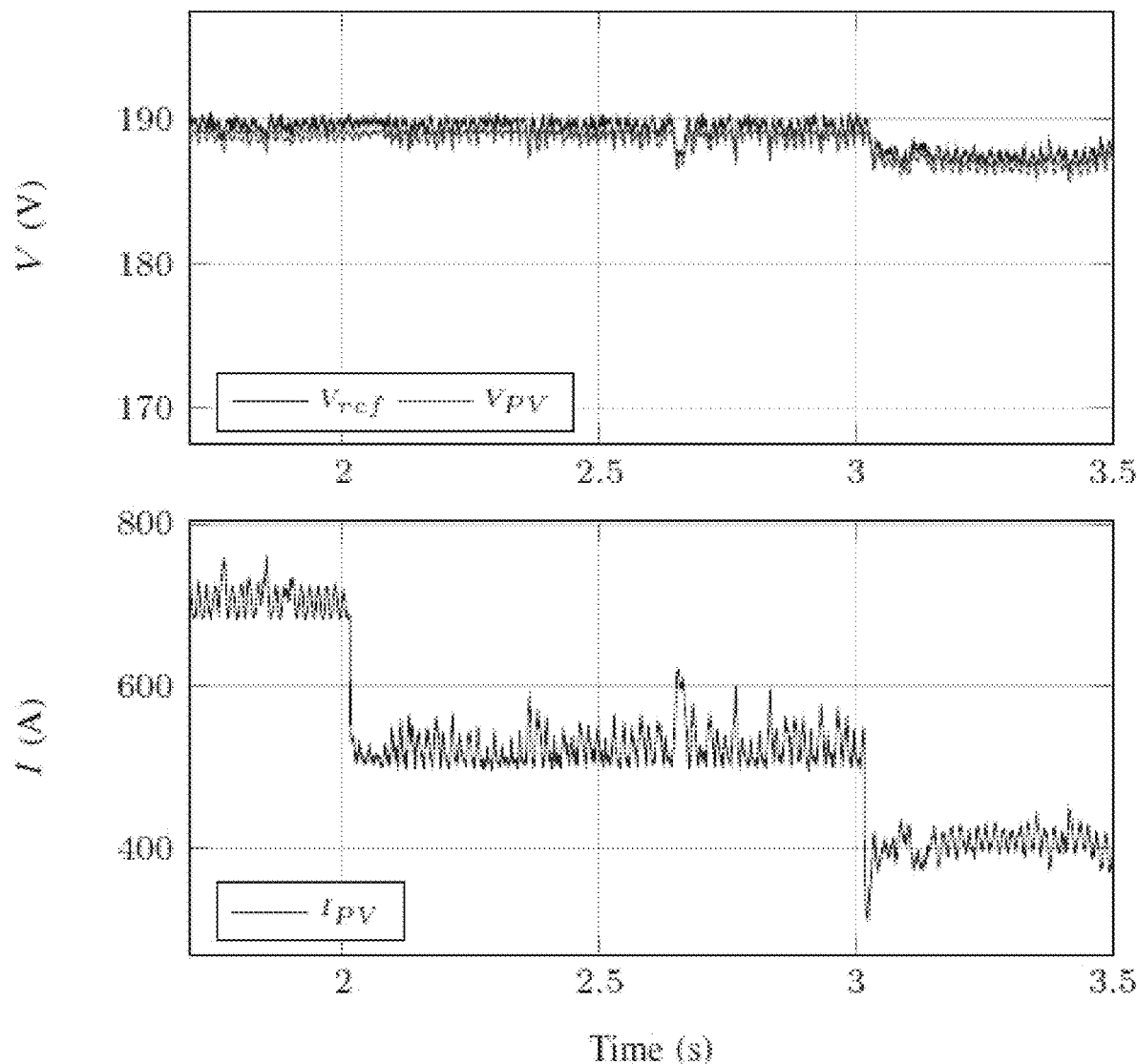
FIG. 5 shows an exemplary PV output voltage and current using the instant control method.

This case verifies the MPPT capability of the instant control method, which aims at extracting the maximum power of the PV array under varying irradiance situations. FIG. 5 shows the PV array instantaneous output voltage ($V_{PV}$) and current ($i_{PV}$) as well as the MPPT voltage reference ($V_{ref}$). At the beginning, the irradiance is set to 1000 W/m$^2$ and the temperature is 25° C. At t=2 s, the irradiance drops from 1000 W/m$^2$ to 800 W/m$^2$. It can be seen from FIG. 5 that the output current of the PV array decreases as the irradiance changes without any undershooting. Moreover, the PV output voltage is tracking its reference $V_{ref}$ closely. A further decline of the irradiance occurred at t=3 s. The irradiance reduces from 800 W/m$^2$ to 600 W/m$^2$. It is demonstrated that both PV voltage and current change their values correspondingly because of the new irradiance level. Again, it is clear that the PV output voltage follows its reference value. Therefore, the instant control strategy provides a fast response as well as good dynamic performance under the varying irradiance conditions.

TABLE II

CASE STUDY SYSTEM PARAMETERS

| Parameter | Symbol | Value |
|---|---|---|
| Standard Testing Irradiance | G | 1000 W/m$^2$ |
| Standard Testing Temperature | T | 25° C. |
| PV Array Maximum Power (STC) | $P_{max}$ | 133 kW |
| PV Array Maximum Point Point Voltage (STC) | $V_{ref}$ | 190 V |
| DC Capacitor | Ci | 5000 uF |
| Output Filter Inductor 1 | L1 | 1 mH |
| Output Filter Inductor 2 | L2 | 1 mH |
| Output Filter Capacitor | Co | 5000 uF |
| Grid Side Voltage | $V_g$ | 100 V |
| Sampling Period | $T_s$ | 100 us |
| PV Parasitic Capacitance | $C_P$ | 13300 nF |

B. Case Study 2

Figure 6:
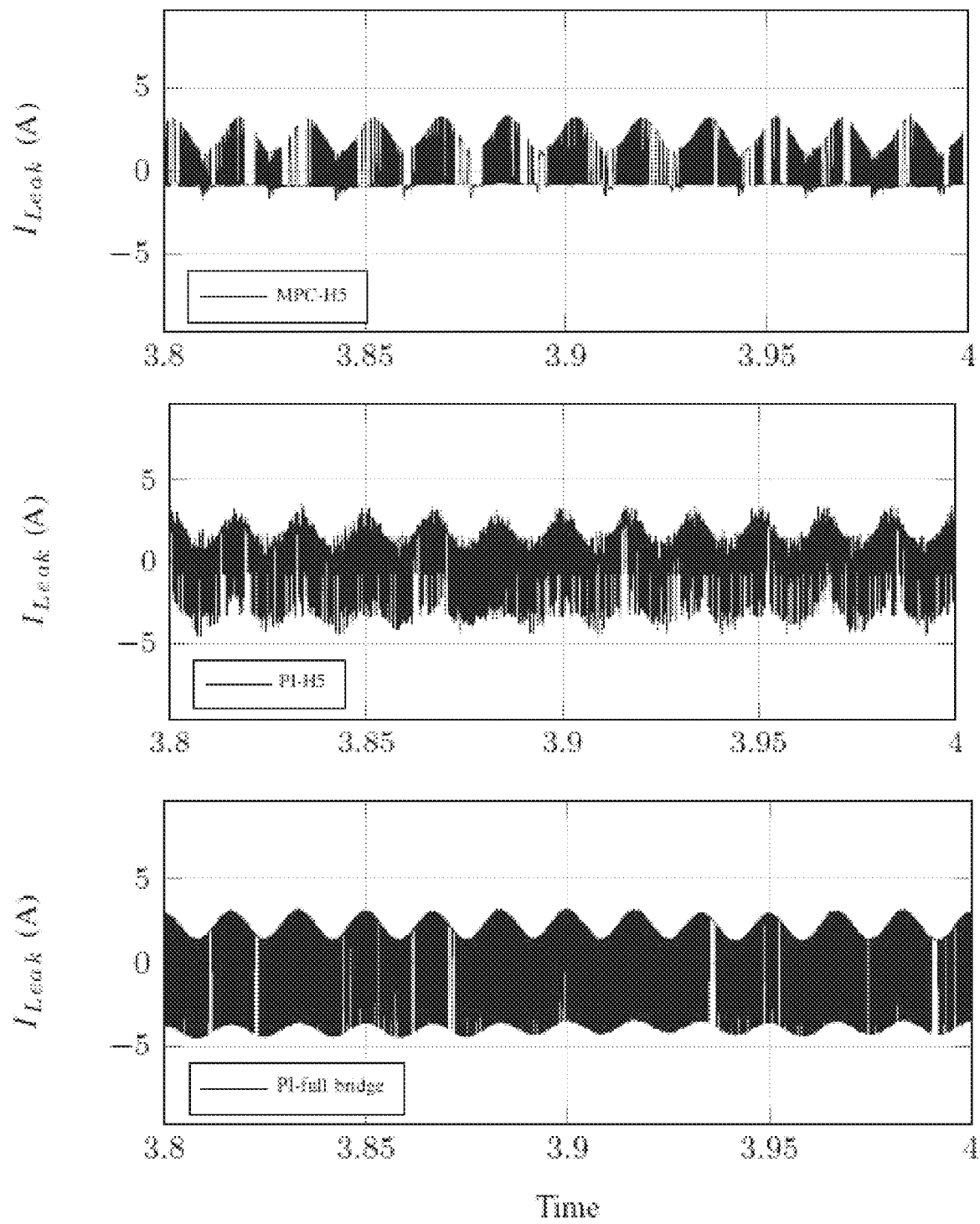
FIG. 6 shows an exemplary leakage current comparison among the MPC-controlled H5 inverter, PI-controlled H5 inverter, and PI-controlled full-bridge inverter.
Figure 7:
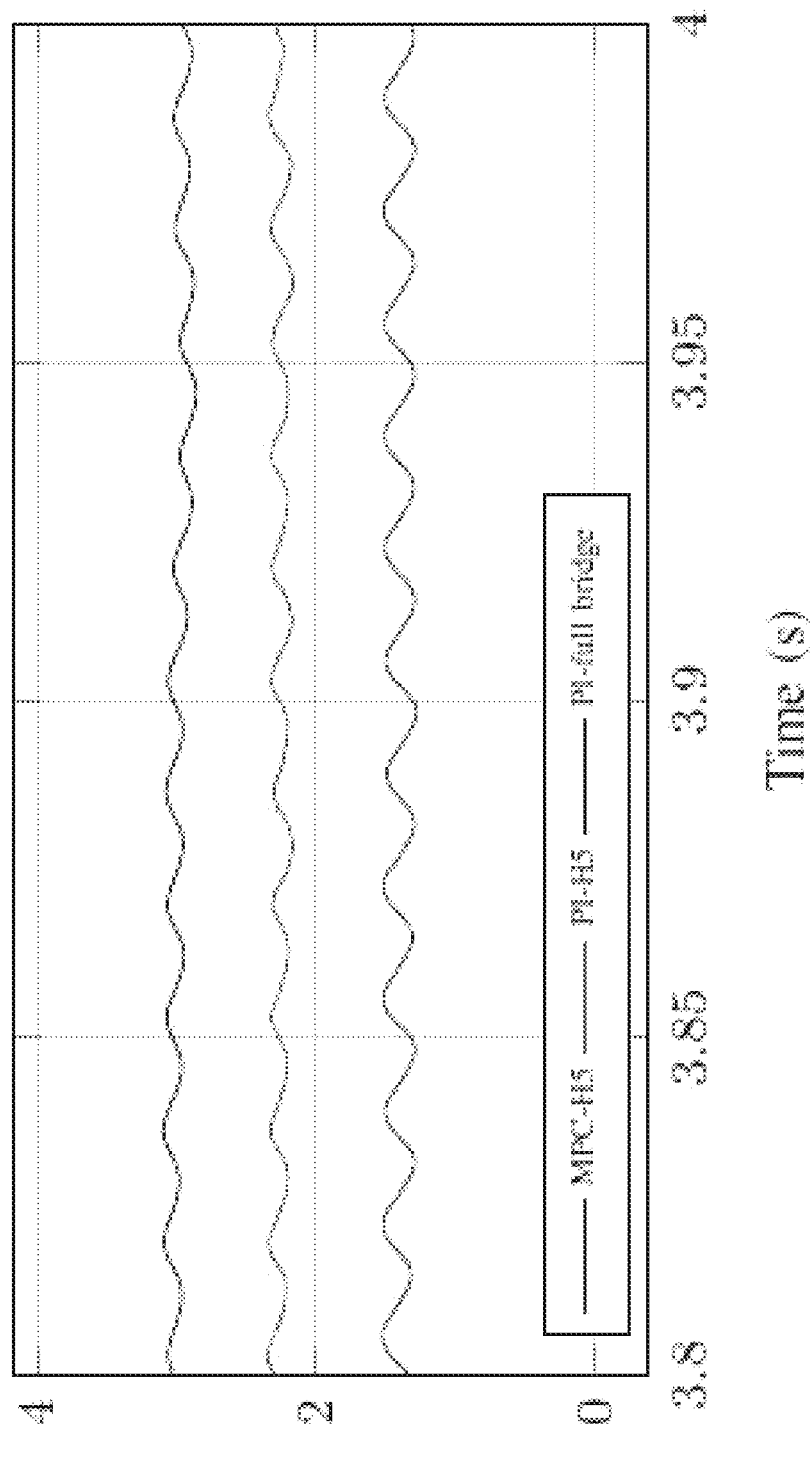
FIG. 7 shows exemplary RMS values of the leakage current.
Figure 8:
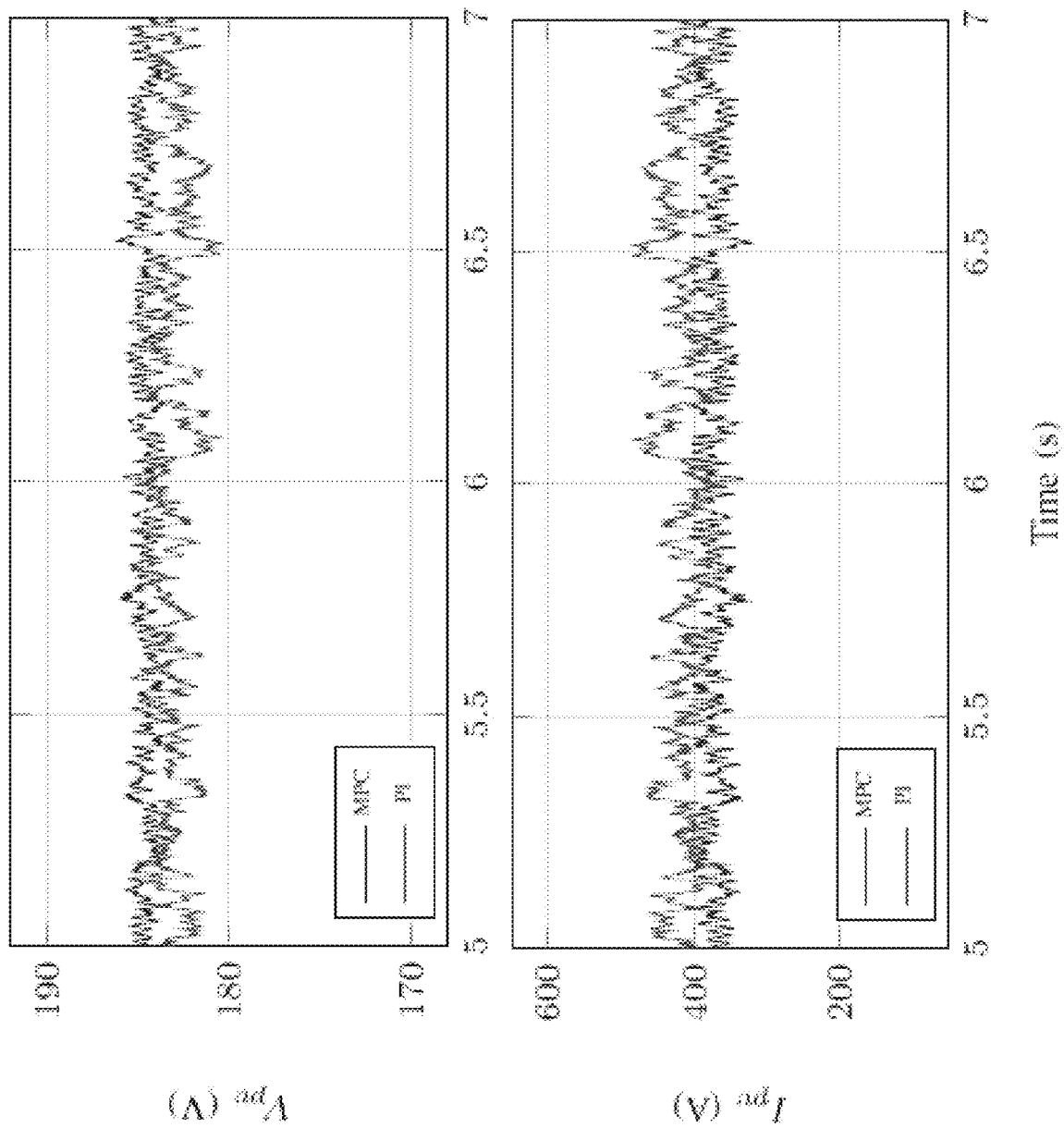
FIG. 8 shows a comparison of the PV output voltage and current using the instant controller and a conventional PI controller.

The following case aims at validating the capability of the instant control strategy for further reducing the CM leakage current in a transformerless PV system with an H5 inverter. FIG. 6 illustrates the instantaneous CM leakage currents of the transformerless PV system by the instant MPC and conventional PI controllers, as well as the leakage current of a PV system with a single-phase full-bridge inverter by a PI controller. FIG. 7 presents their RMS values. To present a reasonable comparison, the MPPT algorithm for all these cases are based on the Incremental Conductance method. From these figures, it is obvious that H5 inverter itself reduces the CM leakage current (RMS) from 3 A to 2.5 A approximately (black and red curves in FIG. 7). The results also show that, for the same configuration (transformerless H5 inverter), the instant system further reduces the leakage current by almost 50% compared with conventional PI controller (blue curve in FIG. 7). This is because, during operation, the instant system reduces the switching modes of the H5 inverter as is analyzed in Section III. The large leakage current that occurs with the conventional controller will affect the reliability and efficiency of the PV system. More importantly, it may cause safety hazards to the system operator and maintenance personnel. FIG. 8 demonstrates the PV output voltage and current using both the instant control strategy and conventional PI control for H5 inverter, which shows that the leakage current affects the performance of the PV system and makes it more oscillatory while instant system gives a smoother and steadier performance.

C. Case Study 3

Figure 9:
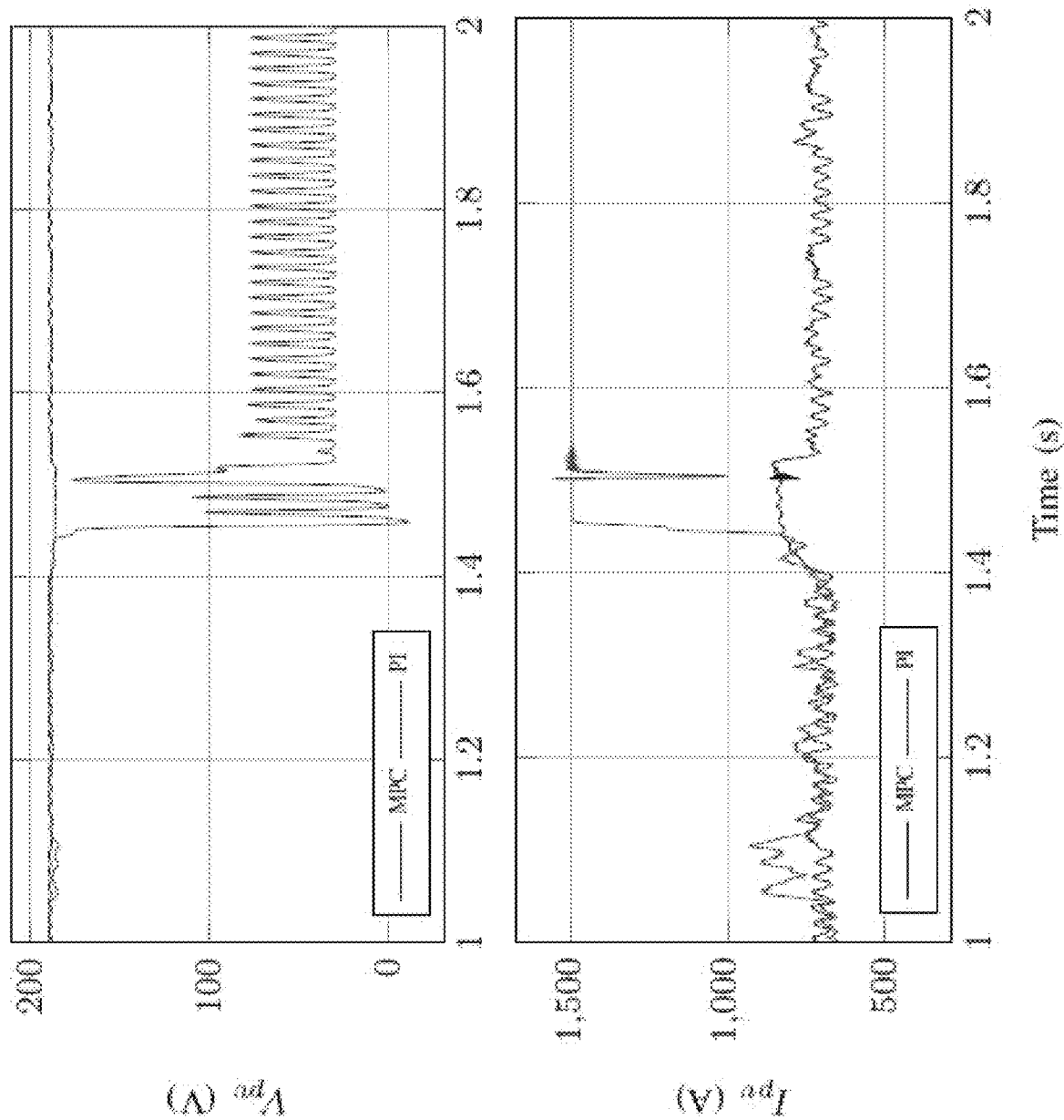
FIG. 9 shows an exemplary output PV voltage and current using both instant controller and conventional PI.

This case demonstrates the fault-ride-through capability of the instant control method. To this end, a ground fault was applied to the system at the output terminal of the PV array. FIG. 9 plots the PV output voltage and current of H5 inverter (using both the instant system and PI controller) before, during, and after the fault. The ground fault is applied at t=1.4 s and it is cleared after 100 ms (FIG. 9). It can be observed that the system controlled by the PI controller is vulnerable. The PV voltage and current become unstable during and even after the clearance of fault (red curves). The PV current increases immediately when the fault occurs, which may cause damage to the system if no further protection actions are applied. Nevertheless, the instant control strategy shows a robust performance (blue curves) and a better fault-ride-through capability under faulted conditions. The PV voltage tracks its reference value both during and after the fault cleared, while the current is limited within a reasonable range.

The case studies verify that the instant system provides a better dynamics response over conventional methods. Moreover, the control strategy further reduces the CM leakage current in the H5 inverter by almost 50% compared with the conventional PI controller. The cases demonstrate the robustness and fault-ride-through capability of the instant method.

In sum, the present solution introduces an innovative control strategy for transformerless grid-connected PV systems with H5 inverters. Transformerless grid-connected PV systems are advantageous due to their multiple merits, e.g., low leakage current and small size. The system can provide model-predictive-control (MPC)-based strategy for controlling transformerless H5 inverter for single-phase PV distributed generation system and reduces the PV leakage current in a cost-effective and safe manner, with fault-ride-through capability. The model-predictive-controlled method is designed to extract the PV maximum power under various operational conditions. The control strategy predicts the future behavior of the PV output voltage and generates the optimal control signals for the H5 inverter, which minimizes the error between the reference and the controlled variable.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods, and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method to control a power inverter, comprising:
   extracting photovoltaic (PV) maximum power under a plurality of operating conditions as one or more reference variables;
   predicting future behaviors of a PV output voltage as one or more controlled variables based on a current operating condition;
   generating one or more control signals for the inverter that minimizes the error between the reference variable and the controlled variables; and
   controlling the power inverter with the one or more control signals.

2. The method of claim 1, wherein the inverter comprises a transformerless inverter.

3. The method of claim 1, wherein the inverter comprises a transformerless grid-connected PV unit.

4. The method of claim 1, wherein the inverter comprises an H5 inverter.

5. The method of claim 4, comprising extracting the maximum power output of a transformerless PV array with the H5 inverter under varying irradiance and temperature.

6. The method of claim 1, comprising determining the optimal control inputs, where at every sampling period Ts, sampling voltage and current values from the transformerless PV array.

7. The method of claim 1, after predicting the future behaviors of the PV output voltage, comprising solving an optimization problem for a cost function.

8. The method of claim 7, wherein the cost function comprises a quadratic cost function.

9. The method of claim 7, wherein the cost function comprises:

$$J = |V_{ref} - V_{PV}(k+1)|^2$$

to an PV array voltage $V_{PV}(k+1)$,
where J is the cost representing the error between the reference and control variable, $V_{PV}(k+1)$ is a predicted future value of PV output voltage, and $V_{ref}$ is a reference value of PV output voltage.

10. The method of claim 7, comprising minimizing an error between a reference and predicted value, and selecting control inputs with the least cost.

11. The method of claim 4, comprising evaluating each possible scenario in the four modes of operation of the H5 inverter and selecting a best operation mode at every sampling step.

12. The method of claim 11, wherein after the best operation mode is determined, comprising sending gating signals to H5 inverter switches.

13. The method of claim 12, comprising automatically selecting one or more H5 inverter switch signals that lead to a minimum error between controlling states and reference states.

14. The method of claim 1, comprising directly applying switching to the H5 inverter without requiring a pulse width modulation (PWM) module.

15. A system, comprising:
    a photovoltaic (PV) array;
    an inverter coupled to the PV array;
    a processor coupled to the PV array and the inverter, the processor having computer readable code to:
      extract photovoltaic (PV) maximum power under a plurality of operating conditions as one or more reference variables;
      predict the future behaviors of a PV output voltage as one or more controlled variables based on a current operational condition;
      generate one or more control signals for the H5 inverter that minimizes an error between the reference variable and the controlled variables; and
      control the power inverter with the one or more control signals.

16. The system of claim 15, wherein the inverter comprises a transformerless inverter.

17. The system of claim 15, wherein the inverter comprises a transformerless grid-connected PV unit.

18. The system of claim 15, wherein the inverter comprises an H5 inverter.

19. The system of claim 18, comprising extracting the maximum power output of a transformerless PV array with the H5 inverter under varying irradiance and temperature.

20. A software application to be executed by a processor, the application having computer readable code to:
    extract photovoltaic (PV) maximum power under a plurality of operating conditions as one or more reference variables;
    predict the future behaviors of a PV output voltage as one or more controlled variables based on a current operational condition;
    generate one or more control signals for the H5 inverter that minimizes an error between the reference variable and the controlled variables; and
    control the power inverter with the one or more control signals.

* * * * *